US012480184B2

(12) United States Patent
Willard et al.

(10) Patent No.: US 12,480,184 B2
(45) Date of Patent: Nov. 25, 2025

(54) ALUMINUM ALLOY, METHOD FOR PRODUCING AN ENGINE COMPONENT, ENGINE COMPONENT, AND USE OF AN ALUMINUM ALLOY TO PRODUCE AN ENGINE COMPONENT

(71) Applicant: FEDERAL-MOGUL NURNBERG GMBH, Nuremberg (DE)

(72) Inventors: Robert Willard, Nuremberg (DE); Isabella Sobota, Nuremberg (DE); Rolf Jager, Pfeffenhausen (DE); Philipp Koch, Nuremberg (DE); Thomas Kirste, Burgthann (DE); Sophia Young, Eckental (DE); Roman Morgenstern, Heilsbronn (DE); Martin Popp, Nuremberg (DE)

(73) Assignee: FEDERAL-MOGUL NURNBERG GMBH, Nuremberg (DE)

( * ) Notice: Subject to any disclaimer, the term of this patent is extended or adjusted under 35 U.S.C. 154(b) by 815 days.

(21) Appl. No.: 15/734,066

(22) PCT Filed: Jun. 19, 2019

(86) PCT No.: PCT/EP2019/066174
§ 371 (c)(1),
(2) Date: Dec. 1, 2020

(87) PCT Pub. No.: WO2019/243411
PCT Pub. Date: Dec. 26, 2019

(65) Prior Publication Data

US 2021/0222271 A1 Jul. 22, 2021

(30) Foreign Application Priority Data

Jun. 20, 2018 (DE) ..................... 10 2018 210 007.1

(51) Int. Cl.
*C22C 21/02* (2006.01)
*B22D 21/00* (2006.01)
*F16J 1/01* (2006.01)

(52) U.S. Cl.
CPC ............ *C22C 21/02* (2013.01); *B22D 21/002* (2013.01); *F16J 1/01* (2013.01)

(58) Field of Classification Search
None
See application file for complete search history.

(56) References Cited

U.S. PATENT DOCUMENTS

| | | | | |
|---|---|---|---|---|
| 2008/0006149 | A1 | 1/2008 | Kato et al. | |
| 2010/0296964 | A1 | 11/2010 | Oda et al. | |
| 2013/0115129 | A1 | 5/2013 | Xing et al. | |
| 2014/0283651 | A1 | 9/2014 | Oda et al. | |
| 2016/0250683 | A1 | 9/2016 | Wang et al. | |
| 2018/0094338 | A1 | 4/2018 | Yamamoto et al. | |
| 2019/0169716 | A1 * | 6/2019 | Wang .................. | B22D 21/007 |

FOREIGN PATENT DOCUMENTS

| | | | | |
|---|---|---|---|---|
| CN | 101463440 | A | 6/2009 | |
| CN | 105925856 | A | 9/2016 | |
| DE | 102011083969 | A1 | 4/2013 | |
| EP | 0924310 | A1 * | 6/1999 | ............. C22C 21/04 |
| EP | 1728882 | A2 | 12/2006 | |
| EP | 1876251 | A2 | 1/2008 | |
| EP | 1975262 | A2 | 10/2008 | |
| EP | 2742163 | A1 | 6/2014 | |
| FR | 2210669 | A1 | 7/1974 | |
| JP | H01108339 | A | 4/1989 | |
| JP | H0860281 | A | 3/1996 | |
| JP | 2005264301 | A | 9/2005 | |
| JP | 2008274403 | A | 11/2008 | |
| JP | 2014152375 | A | 8/2014 | |
| JP | 2015086445 | A | 5/2015 | |
| JP | 2019191367 | A * | 10/2019 | |
| WO | 2012008470 | A1 | 1/2012 | |
| WO | 2013054716 | A1 | 4/2013 | |
| WO | 2016167322 | A1 | 4/2017 | |

OTHER PUBLICATIONS

Müller, H. J., Handbuch der Schmelz-und Legierungspraxis für Leichtmetalle. 3rd edition, Berlin, Fachverlag Schiele & Schön GmbH, 1977, pp. 140-149, ISBN 3 7949 0247 5.

International Search Report, mailed Oct. 17, 2019 (PCT/EP2019/066174).

Pratheesh K et al. "Study on the Effects of Squeeze Pressure on Mechanical Properties and Wear Characteristics of Near Eutectic Al—Si—Cu—Mg—Ni Piston Alloy with Variable Mg Content" Transactions of the Indian Institute of Metals, Springer India, IN, vol. 68. No. 1. Jul. 14, 2015 (Ju. 14, 2015). pp. 59-66. DOI: 10.1007/SI2666-015-0607-8 ISSN: 0972-2815. XP035520887, abstract; table 1.

* cited by examiner

*Primary Examiner* — George Wyszomierski
*Assistant Examiner* — Janell C Morillo
(74) *Attorney, Agent, or Firm* — Dickinson Wright PLLC

(57) ABSTRACT

An aluminum alloy, and in particular a cast aluminum alloy, for producing an engine component, in particular a piston for an internal combustion engine, consists of the following alloying elements: Silicon: 10% by weight to <13% by weight, nickel: to <0.6% by weight, copper: 1.5% by weight to <3.6% by weight, magnesium: 0.5% by weight to 1.5% by weight, iron: 0.1% by weight to 0.7% by weight, manganese: 0.1 to 0.4% by weight, zirconium: >0.1 to <0.3% by weight, vanadium: >0.08 to <0.2% by weight, titanium: 0.05 to <0.2% by weight, phosphorus: 0.0025 to 0.008% by weight, and as balance aluminum and unavoidable impurities.

2 Claims, No Drawings

ALUMINUM ALLOY, METHOD FOR PRODUCING AN ENGINE COMPONENT, ENGINE COMPONENT, AND USE OF AN ALUMINUM ALLOY TO PRODUCE AN ENGINE COMPONENT

BACKGROUND

1. Technical Field

The present invention relates to an aluminum alloy, in particular a cast aluminum alloy, a method for producing an engine component, in particular a piston for an internal combustion engine, in which an aluminum alloy is cast using the gravity die casting method, an engine component consisting at least partially of an aluminum alloy, and the use of an aluminum alloy to produce such an engine component.

2. Related Art

In recent years, there has been a growing demand for particularly economical and thus ecological means of transport, which have to meet high consumption and emission requirements. There has furthermore always been the need to design engines to be as high performance and low in consumption as possible. Pistons that can be used at increasingly higher combustion temperatures and combustion pressures, which is essentially made possible by increasingly higher performance piston materials, are a decisive factor for the development of high-performance and low-emission internal combustion engines. This means that the piston material and the development of increasingly higher performance materials for pistons are of decisive importance.

A piston for an internal combustion engine fundamentally has to have a high heat resistance and must at the same time be as light and strong as possible. A reduction in piston weight while maintaining or even improving the piston properties is particularly desirable. In this respect it is of particular importance how the microstructural distribution, the morphology, the composition and the thermal stability of highly heat-resistant phases are configured. An optimization in this respect normally takes into consideration a minimal content of pores and oxide inclusions.

The sought-after, advantageous piston material must be optimized both as regards isothermal fatigue strength ("High Cycle Fatigue" HCF) and as regards thermomechanical fatigue strength ("Thermo Mechanical Fatigue" TMF). In order to configure the TMF properties as optimally as possible, the finest possible microstructure of the material should always be aimed for. A fine microstructure reduces the risk of the occurrence of microplasticity or microcracks at relatively large primary phases (in particular at primary silicon precipitates) and thus also the risk of crack initiation and crack growth.

Under TMF stress, microplasticities and/or microcracks, which can considerably reduce the lifespan of the piston material, occur at relatively large primary phases, in particular at primary silicon precipitates, owing to the different coefficients of expansion of the individual components of the alloy, namely the matrix and the primary phases. In order to increase the TMF-HCF lifespan, it is known to keep the primary phases as small and fine as possible.

In particular high-alloy, near eutectic or hypereutectic aluminum/silicon alloys have favorable mechanical properties at high operating temperatures. In this respect, the phase size must be limited with regard to the primary silicon and the resulting intermetallic phases.

DE 10 2011 083 969 A1 discloses in this regard a method for producing an engine component, in particular a piston for an internal combustion engine, in which an aluminum alloy is cast using the gravity die casting method. The aluminum alloy contains the following alloying elements: Silicon: 6% by weight to 10% by weight, nickel: 1.2% by weight to 2% by weight, copper: 8% by weight to 10% by weight, magnesium: 0.5% by weight to 1.5% by weight, iron: 0.1% by weight to 0.7% by weight, manganese: 0.1% by weight to 0.4% by weight, zirconium: 0.2% by weight to 0.4% by weight, vanadium: 0.1% by weight to 0.3% by weight, titanium: 0.1% by weight to 0.5% by weight. Here, high concentrations of the expensive element copper are required in order to produce the highly heat resistant alloy.

For engine components that can withstand high thermal stresses, conventional cast aluminum alloys similarly normally require between 5 and 7% by weight for the sum of the alloying elements copper and nickel as strength-increasing alloying elements as well as 11 to 13% by weight of silicon. The addition of relatively large amounts of the expensive and heavy elements copper and nickel particularly increases the density of the piston material and thus the weight of the piston. In light of the above efforts, it is therefore necessary to find a compromise between weight, strength and cost.

SUMMARY

An aluminum alloy is provided that can be cast by gravity die casting, has a low density and nevertheless contains an increased proportion of finely dispersed, highly heat-resistant, thermally stable phases.

As with pressure die casting, there is also an upper concentration limit for gravity die casting up to which alloying elements should be introduced and above which the castability of the alloy is made difficult or impossible. Moreover, too high concentrations of strength-increasing elements result in the formation of large plate-shaped intermetallic phases that drastically reduce fatigue strength. This is taken into account in the present invention.

An aluminum alloy, in particular a cast aluminum alloy, containing the alloying elements

- silicon (Si): 10.0% by weight to <13.0% by weight,
- nickel (Ni): to <0.6% by weight,
- copper (Cu): 1.5% by weight to <3.6% by weight,
- magnesium (Mg): 0.5% by weight to 1.5% by weight,
- iron (Fe): 0.1% by weight to 0.7% by weight,
- manganese (Mn): 0.1 to 0.4% by weight,
- zirconium (Zr): >0.1 to <0.3% by weight,
- vanadium (V): >0.08 to <0.2% by weight,
- titanium (Ti): 0.05 to <0.2% by weight,
- phosphorus (P): 0.0025 to 0.008% by weight, and as balance aluminum and unavoidable impurities, or optionally consisting thereof, and thus furthermore having particularly favorable properties as regards heat resistance and, on account of reduced density compared to the prior art, being suitable for the production of weight-reduced and heavy-duty pistons for internal combustion engines. Preferably, the aluminum alloy according to the invention is nickel-free and therefore does not contain significant amounts of nickel (Ni).

The contents of copper and nickel that are significantly reduced compared to the prior art on the one hand advantageously reduce the overall costs of alloy production since they are among the most expensive alloying elements, and thus any (partial) substitution or reduction in the contents of these two elements results in considerable cost savings. On the other hand, this reduces the density of the aluminum material. The present invention is characterized by the fact that owing to the optimum adjustment of the alloying elements magnesium, iron, manganese, zirconium, vanadium and titanium, good and sufficient strength is nevertheless ensured despite the significant reduction in the contents of the elements copper and nickel that are otherwise necessary to withstand high thermal stresses. The silicon content according to the invention serves to achieve good castability of the aluminum material.

The above alloy according to the invention preferably consists of the listed components and contains only the listed components and otherwise only unavoidable impurities, i.e. components in low concentration that have not been deliberately added as functional components. The alloy according to the invention is then preferably free of further elements and in particular free of beryllium (Be) and/or calcium (Ca).

Furthermore, it is preferred that the aluminum alloy or cast aluminum alloy according to the invention contains 11.0 to <12.5 silicon and/or 1.8 to <2.6% by weight copper and/or 0.8% by weight to 1.2% by weight magnesium and/or 0.4% by weight to 0.6% by weight iron. Advantageously, the aluminum alloy or cast aluminum alloy according to the invention has an iron/manganese ratio of 2:1 and preferably between 2:1 and 5:1 and/or a sum of the contents of iron and manganese not exceeding 0.9% by weight.

The discovered aluminum alloy is advantageously produced or processed according to the invention using the gravity die casting method.

An engine component according to the invention, in particular a piston for an internal combustion engine, preferably consists at least partially of one of the aforementioned aluminum alloys according to the invention. Such an engine component according to the invention has a high heat resistance. In a piston produced in accordance with the invention, there is furthermore only a small amount of primary silicon and silicon precipitates of acceptable size in the thermally highly stressed bowl rim area or bottom area thereof, and thus the alloy leads in particular to a very high heat resistance of a piston produced in accordance with the invention.

A further aspect of the invention is the preferred use of the aluminum alloy according to the invention as described above for the production of an engine component, in particular a piston of an internal combustion engine.

The invention claimed is:

1. A method for producing an engine component, comprising gravity casting an aluminum alloy consisting of the following alloy elements:

silicon: 11% by weight to <12.5% by weight,
copper: 1.8% by weight to <2.6% by weight,
magnesium: 0.8% by weight to 1.2% by weight,
iron: 0.4% by weight to 0.6% by weight,
manganese: 0.1 to 0.4% by weight,
zirconium: >0.1 to <0.3% by weight,
vanadium: >0.08 to <0.2% by weight,
titanium: 0.05 to <0.2% by weight,
phosphorus: 0.0025 to 0.008% by weight, and as balance aluminum and unavoidable impurities, wherein a ratio of the iron to the manganese is between 2:1 to 5:1, and the sum of the iron and the manganese does not exceed 0.9% by weight.

2. The method of claim 1, wherein the engine component produced by the method is a piston for an internal combustion engine.

* * * * *